US012650148B2

(12) United States Patent
Borges Da Silva et al.

(10) Patent No.: US 12,650,148 B2
(45) Date of Patent: Jun. 9, 2026

(54) HUB BEARING UNIT

(71) Applicants: AKTIEBOLAGET SKF, Gothenburg (SE); SKF Argentina S.A., Tortuguitas (AR); SKF do Brasil Ltda, Cajamar (BR)

(72) Inventors: Marcelo Borges Da Silva, Jundiaí (BR); Giorgia D'Amico, Turin (IT); Diego Toso, Villa de Mayo (AR)

(73) Assignees: AKTIEBOLAGET SKF, Gothenburg (SE); SKF Argentina S.A., Tortuguitas (AR); SKF do Brasil Ltda, Cajamar (BR)

( * ) Notice: Subject to any disclaimer, the term of this patent is extended or adjusted under 35 U.S.C. 154(b) by 127 days.

(21) Appl. No.: 18/635,175

(22) Filed: Apr. 15, 2024

(65) Prior Publication Data

US 2024/0352975 A1     Oct. 24, 2024

(30) Foreign Application Priority Data

Apr. 20, 2023     (IT) ......................... 102023000007710

(51) Int. Cl.
| *F16C 33/78* | (2006.01) |
| *F16C 33/80* | (2006.01) |
| *F16C 19/18* | (2006.01) |

(52) U.S. Cl.
CPC ...... *F16C 33/7863* (2013.01); *F16C 33/7883* (2013.01); *F16C 33/805* (2013.01); *F16C 19/18* (2013.01)

(58) Field of Classification Search
CPC .............. F16C 33/7863; F16C 33/7866; F16C 33/7879; F16C 33/7883; F16C 33/805; B60B 27/0073
See application file for complete search history.

(56) References Cited

U.S. PATENT DOCUMENTS 657,201 A * 9/1900 Melvin ................. A01B 23/06
384/460
5,611,292 A 3/1997 Clark et al.
(Continued)

FOREIGN PATENT DOCUMENTS

DE      102016202412 A1     8/2016
DE      102018126425 A1     4/2020
(Continued)

OTHER PUBLICATIONS

Translation of JP 2010007819 obtained Oct. 16, 2025.*
(Continued)

*Primary Examiner* — James Pilkington
(74) *Attorney, Agent, or Firm* — J-TEK LAW PLLC; Scott T. Wakeman; Mark A. Ussai

(57) ABSTRACT

A hub bearing unit includes a hub, a bearing unit having an internal seat, an outer ring connected to the internal seat, a inner ring, and a sealing device between the inner and outer rings. The sealing device includes a first shield mounted to the inner ring, a second shield mounted to the outer ring, and an elastomeric seal body on the second metallic shield. The hub has a radially inwardly extending shoulder delimiting the internal seat and located axially outward of the first shield, and a path extends from outside the hub to the gap. The path includes a first portion defined by an axially inwardly facing surface of the shoulder and an axially outwardly facing surface of the shield and a second path portion between a radially outer edge of the shield and a radially inwardly facing cylindrical surface of the elasto-meric seal body.

14 Claims, 3 Drawing Sheets

(56)     References Cited

U.S. PATENT DOCUMENTS

| | | | | |
|---|---|---|---|---|
| 6,619,851 | B2 * | 9/2003 | Vogelgesang | ......... F16C 19/184 |
| | | | | 384/488 |
| 7,159,871 | B2 | 1/2007 | Oldenburg | |
| 11,912,065 | B2 * | 2/2024 | Kim | ......................... F16D 3/845 |
| 2009/0206553 | A1 | 8/2009 | Kanzaki | |
| 2018/0335088 | A1 | 11/2018 | Restivo | |
| 2019/0085905 | A1 | 3/2019 | Nebbia et al. | |
| 2021/0048064 | A1 * | 2/2021 | Christie | ............... F16C 19/166 |
| 2021/0370716 | A1 | 12/2021 | Kim | |
| 2023/0072450 | A1 | 3/2023 | Bertolini et al. | |

FOREIGN PATENT DOCUMENTS

| | | | | | |
|---|---|---|---|---|---|
| DE | 102021124846 | A1 | | 3/2023 | |
| EP | 0807775 | B1 | | 6/2001 | |
| EP | 1650480 | A1 | | 4/2006 | |
| EP | 2946648 | A1 | | 11/2015 | |
| EP | 2857704 | B1 | | 7/2016 | |
| EP | 3336371 | B1 | | 10/2019 | |
| JP | 2010007819 | A | * | 1/2010 | ............ F16C 35/067 |
| JP | 2010091036 | A | * | 4/2010 | ............ F16C 33/805 |

OTHER PUBLICATIONS

Written Opinion and Search Report from the Italian Patent Office mailed Oct. 18, 2023 in related application No. IT 102023000007710.
Office Action and Search Report from the Swedish Patent Office dispatched Nov. 13, 2024 in related application No. 2450412-8.

* cited by examiner

HUB BEARING UNIT

CROSS-REFERENCE

This application claims priority to Italian patent application no. 10 2023 000007710 filed on Apr. 20, 2023, the contents of which are fully incorporated herein by reference.

TECHNOLOGICAL FIELD

The present disclosure relates to a hub bearing unit provided with a sealing device. The hub bearing unit is applicable preferably, but not exclusively, to machines for use in agriculture.

BACKGROUND

In agriculture, hub bearing units are known in which the hub of the agricultural machine has, for example, arms for seeding or a disc for plowing land, with a bearing unit housed in the hub. The bearing unit may also include a radially inner stationary ring that is normally mounted on a central shaft that is solidly connected to the frame of the agricultural machine and a radially outer rotatable ring that is solidly connected to the hub of the agricultural machine. The relative rotation of the outer ring with respect to the inner ring is ensured by a plurality of rolling elements, typically balls. The balls may be assembled in two rows and are able to rotate inside a pair of radially external raceways made on the inner ring and a corresponding pair of radially internal raceways made on the outer ring.

As protection against external contaminants, the bearing units are provided with suitable sealing devices, for example, cassette sealing devices. These cassette seals are typically made in two parts, a rotatable portion, mounted, for example, on the radially outer ring of the bearing unit and a stationary portion, mounted, for example, on the radially inner ring of the bearing unit. Again by way of example, the stationary portion may comprise a metallic shield mounted by interference on the radially inner ring. Conversely, a second metallic shield, on which an elastomeric portion is co-molded (overmolded), may be mounted by interference on the rotatable radially outer ring.

According to this prior art, the portion of the seal made of elastomeric material comprises one or more protrusions referred to as lips which have various shapes and orientations (typically axial and radial) and are in contact with surfaces of the stationary metallic shield: in this way, the sealing device prevents the ingress of external contaminants, thereby protecting the internal components of the bearing unit, namely, the rolling bodies and the cages for holding the rolling bodies.

Although the known cassette sealing devices are efficient, they do not perform well enough to ensure protection from contaminants for bearing units used in agriculture, as these bearing units operate in environments in which they are exposed to a great many contaminants, both liquids and dust.

Therefore, it is often necessary to use complex sealing solutions, both integrated in the bearing units and external thereto, requiring the use of a higher number of components, some of which need to be customized to the application, with a consequent increase in costs.

SUMMARY

To solve the technical problem set out above, it is an aspect of the present disclosure to provide a hub bearing unit having a highly efficient sealing device.

An aspect of the disclosure comprises a hub bearing unit that includes a hub having a cylindrical internal seat, a bearing unit including a rotatable outer ring connected to the internal seat and a stationary inner ring inside the outer ring, and a sealing device at least partly located in a gap between the outer ring and the inner ring. The sealing device includes a first shield mounted to a radially outer cylindrical surface of the radially inner ring, a second shield mounted by on a radially inner cylindrical surface of the radially outer ring, and at least one elastomeric seal body on at least a portion of the second metallic shield. The hub has a radially inwardly extending shoulder axially delimiting the internal seat and located axially outward of the first shield, and a path extends from outside the hub to the gap. The path includes a first path portion defined by a first axially inwardly facing surface of the shoulder and an axially outwardly facing surface of the first shield and a second path portion extending from the first path portion and between a radially outer edge of the first shield and a radially inwardly facing cylindrical surface of the at least one elastomeric seal body.

Further embodiments, which are preferred and/or particularly advantageous, are described below.

BRIEF DESCRIPTION OF THE DRAWINGS

Embodiments of the invention will now be described with reference to the attached drawings.

DETAILED DESCRIPTION

Aspects of the invention will now be described with reference, by way of example, to two embodiments of a hub bearing unit for use in the agricultural field. In particular, in these exemplary embodiments, the hub bearing unit has an oblique-contact ball bearing unit with a double row of balls.

Throughout the present description and in the claims, terms and expressions indicating positions and orientations, such as "radial" and "axial", are to be understood with reference to the central axis of rotation X of a bearing unit 30. On the other hand, expressions such as "axially external" and "axially outer" and "axially internal" and "axially inner" refer to the hub bearing unit when mounted.

Figure 1:
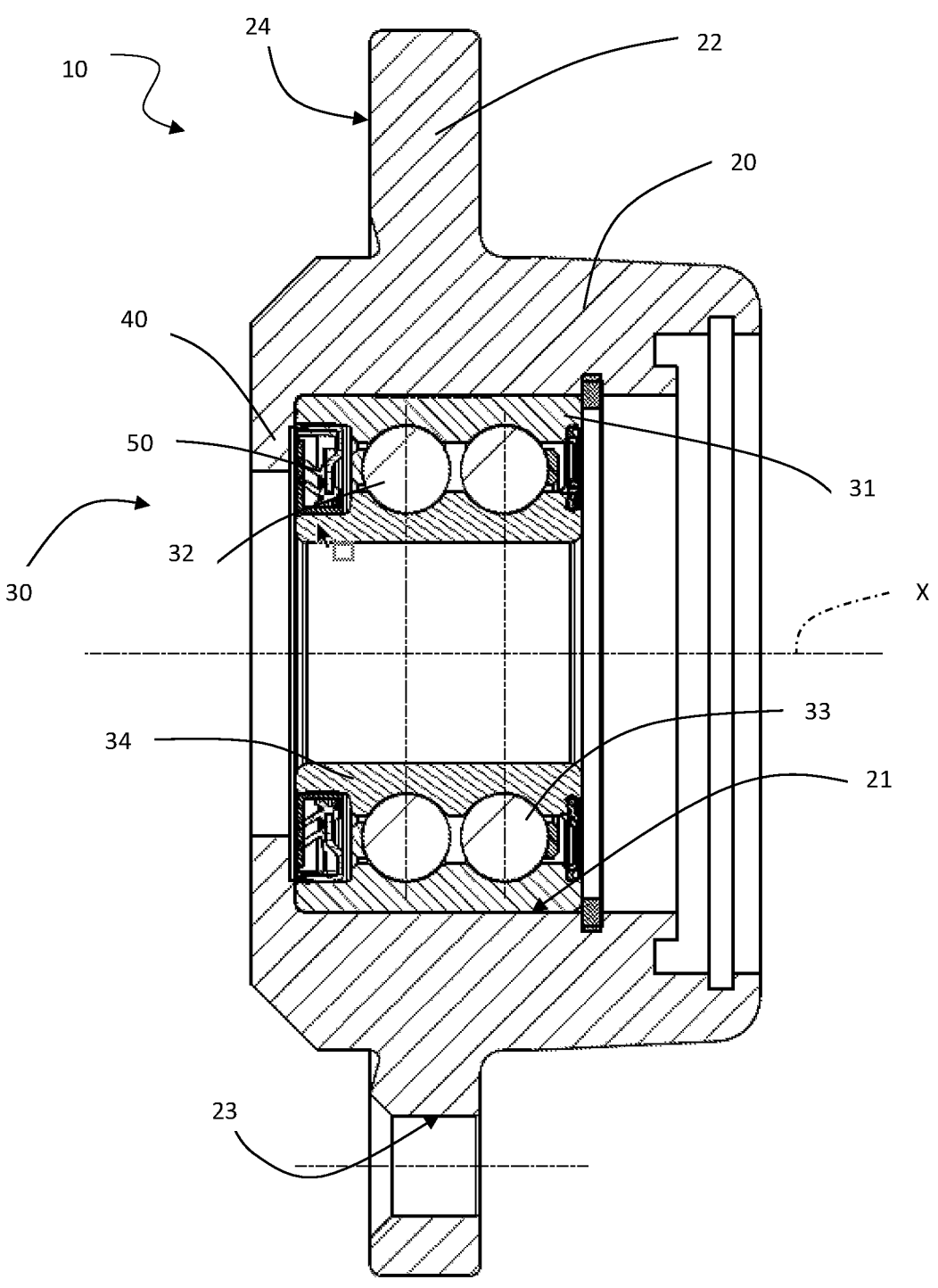
FIG. 1 is a cross section through a hub bearing unit according to a first embodiment of the present disclosure.

With reference to FIG. 1, a first hub bearing unit 10 according to the present disclosure comprises a hub 20 and a bearing unit 30.

The hub 20 is provided with a radially inner cylindrical seat 21 and an axially outer shoulder 40 that projects radially inwardly and axially delimits the seat 21. The bearing unit 30 is housed inside the seat 21. The hub 20 is also provided with a flange 22 having a plurality of fixing holes 23 and an annular surface 24 perpendicular to an axis of rotation X of the bearing unit 30. Fixing means, such as screws or bolts, which are known and not shown in the figure, are used in the corresponding fixing holes 23 to lock a disc (also known and therefore not shown in the figure) onto the annular surface 24 for working the land, for example for plowing land.

The bearing unit 30 includes a radially inner stationary ring 34 that is solidly connected to the frame of the agricultural machine (known and therefore not shown), a radially outer rotatable ring 31 that is solidly connected to the hub 20 of the agricultural machine, and a double row 32, 33 of rolling bodies, in this case balls between the inner and outer rings 34, 31.

The bearing unit also includes a cassette sealing device 50 for protection against the types of contaminants (mud, liquids, dust) typically found in agricultural environments.

Figure 2:
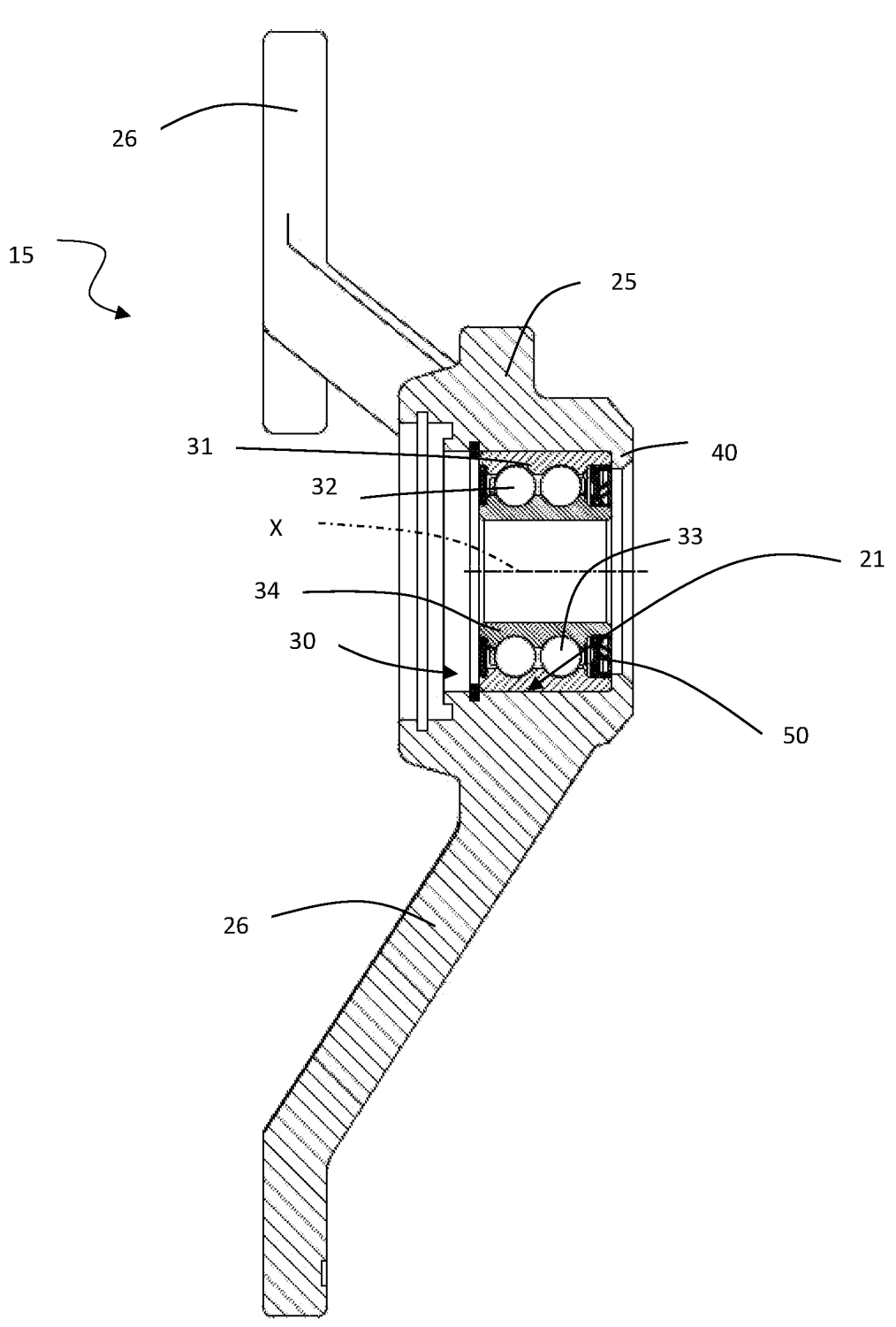
FIG. 2 is a cross section through a hub bearing unit according to a second embodiment of the present disclosure.

With reference to FIG. 2, a second hub bearing unit 15 according to the present disclosure comprises a hub 25 and the bearing unit 30.

As in the solution of the embodiment of FIG. 1, the hub 25 is provided with a radially inner cylindrical seat 21 and an axially outer shoulder 40 that projects radially inward and that axially delimits the seat 21. The bearing unit 30 is housed inside the seat 21. The hub 25 also has three radially external arms 26 for soil seeding. The bearing unit 30 is the same as that already described for the first hub bearing unit 10 of FIG. 1.

Figure 3:
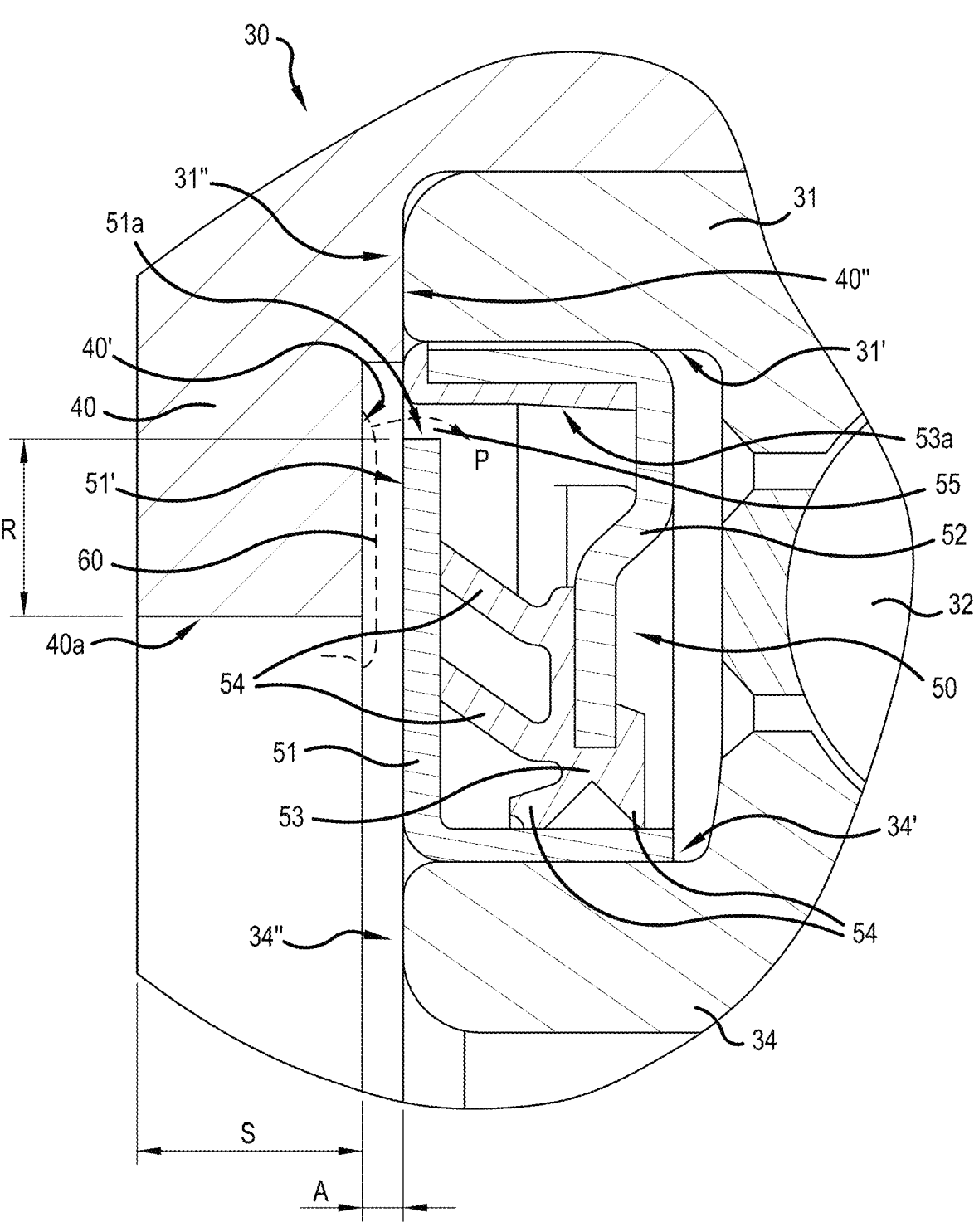
FIG. 3 is a detail in cross section and on an enlarged scale of a portion of the hub bearing unit of FIG. 1 or of FIG. 2.

With reference also to FIG. 3, for the embodiments of both FIG. 1 and FIG. 2, the sealing device 50 includes a first stationary metallic shield 51 that is mounted by an interference fit on a radially outer cylindrical surface 34' of the radially inner ring 34 and a second rotatable metallic shield 52 mounted by interference fit on a radially inner cylindrical surface 31' of the radially outer ring 31. The second shield 52 supports an elastomeric body 53 co-molded on the second shield 52 that extends substantially radially inward and axially outward from the second shield 52.

The elastomeric body has at least one seal lip 54 (four in the example of FIG. 3) which is in frictional contact with the first stationary shield 51 to prevent ingress of contaminants into the bearing unit 30.

According to the present disclosure, the shoulder 40 of the hub 20 or of the hub 25 lies axially outward of the first shield 51 of the sealing device 50. Furthermore, the shoulder 40 partially radially overlaps the first shield 51. In other words, a radially inner edge 40a of the shoulder 40 is located a first distance from the axis of rotation X, a radially outer edge 51a of the first shield 51 is located a second distance from the axis of rotation X, and the first distance is less than the second distance.

This creates a tortuous path P which, in addition to the sealing device 50, forms a further barrier to the ingress of contaminants into the bearing unit 30. In particular, in order to get inside the sealing device 50, contaminants have to travel the length of the tortuous path P which path includes a first portion 60 between a first axially inner annular surface 40' of the shoulder 40 and an axially outer annular surface 51' of the first shield 51 and a second portion 55 located radially between a radial edge 51a of the first shield 51 and a radially inner cylindrical surface 53a of the elastomeric body 53.

Therefore, the tortuous path P collaborates with the sealing device 50 to create a labyrinth seal. There is thus a synergistic effect between the shoulder 40 and the sealing device 50 which enhances the sealing performance of the hub bearing unit (both of the first unit 10 and of the second unit 15).

The axial dimension A of the first path portion 60 may advantageously be optimized by adjusting the relative axial positions of the shoulder 40 and the sealing device 50. To be specific, the axial position of the sealing device 50 is determined by the fact that an axially outer annular surface 31" of the radially outer ring 31 abuts against a second annular surface 40" of the shoulder 40, the second annular surface 40" being located axially inward and radially outward from the first annular surface 40' of the shoulder 40. In addition, an axially outer annular surface 34" of the radially inner ring 34 is axially aligned with the annular surface 31" of the radially outer ring 31.

These two conditions determine the axial position of the first shield 51 (mounted on the radially outer surface 34' of the radially inner ring 34) of the sealing device 50 relative to the shoulder 40. More specifically, these two conditions determine the relative axial positions of the first annular surface 40' of the shoulder 40 and the annular surface 51' of the first shield 51, and hence the axial dimension A of the first path portion 60.

Preferably, the axial dimension A of the first path portion 60 should be between 0.1 mm and 0.2 mm. A dimension smaller than 0.1 mm cannot be ensured owing to the tolerance chain of the components, while a dimension greater than 0.2 mm would make the labyrinth seal of the tortuous path P less efficient.

Preferably, the radial overlap R between the shoulder 40 and the first shield 51 of the sealing device 50 should be between 0.2 mm and 0.5 mm. Values below 0.2 mm would be detrimental to the sealing performance of the tortuous path P, while values above 0.5 mm would make the shoulder 40 protrude too much with respect to the seat 21 of the hub 20, 25 and, therefore, would place excessive shear stress on the shoulder 40.

To better withstand shear stress, the shoulder 40 should have an axial thickness S between 5.5 mm and 6.0 mm. To be specific, values below 5.5 mm would impair the shear strength of the shoulder 40, while values above 6.0 mm would be detrimental in terms of weight and axial bulk of the hub bearing unit.

Preferably, the first shield 51 is L shaped in cross section and is made of stainless steel to reduce oxidation on its axially outer surface 51'. Moreover, the first shield 51 has a thickness of 0.4 mm which helps to optimize the axial dimension A of the first meatus 60. The shield includes a cylindrical portion that contacts the seat 21 and a flange that extends radially outwardly from the cylindrical portion.

To sum up, the present disclosure defines a sealing system in which the presence of the tortuous path P improves sealing against contaminants. Moreover, for the same sealing performance, less friction torque is required for rotation of the agricultural tools. This means a lower fuel consumption and/or the possibility of increasing the speed of the agricultural machine. Lastly, the present solution makes it possible to lower maintenance costs and increase the service life of the components and the machine.

In addition to the embodiment of the disclosure as described above, it is to be understood that there are numerous other variants. It is also to be understood that the embodiments are merely examples and do not limit the scope of the disclosure, its applications, or its possible configurations. On the contrary, although the above description enables those skilled in the art to apply the present disclosure according to at least one exemplary embodiment, it is to be understood that numerous variations of the components described may be devised, without thereby departing from the scope of the disclosure as defined in the appended claims, interpreted literally and/or according to their legal equivalents.

What is claimed is:
1. A hub bearing unit comprising:
a hub having a cylindrical internal seat,
a bearing unit including a rotatable outer ring connected to the internal seat and a stationary inner ring inside the outer ring, and a sealing device at least partly located in a gap between the outer ring and the inner ring, wherein the sealing device comprises:

a first shield mounted to a radially outer cylindrical surface of the radially inner ring, a second shield mounted by on a radially inner cylindrical surface of the radially outer ring, and at least one elastomeric seal body on at least a portion of the second shield, wherein the hub includes a radially inwardly extending shoulder formed as one piece with the hub, the shoulder having a first annular surface facing the first shield and having a second annular surface, the second annular surface being in axial contact with an axially outer surface of the outer ring and the first annular surface being located radially inward of the second annular surface and axially offset from the second annular surface in a direction away from the sealing device, wherein a path extends from outside of the hub to the gap, and wherein the path includes a first path portion defined by the first annular surface of the shoulder and an axially outwardly facing surface of the first shield and a second path portion extending from the first path portion and between a radially outer edge of the first shield and a radially inwardly facing cylindrical surface of the at least one elastomeric seal body.

2. The hub bearing unit according to claim 1, wherein the first shield is metallic and mounted to the radially outer cylindrical surface of the radially inner ring with an interference fit, wherein the second shield is metallic and mounted to the radially inner cylindrical surface of the radially outer ring with an interference fit, and wherein the at least one elastomeric seal body is overmolded on the second shield.

3. The hub bearing unit according to claim 2, wherein the hub includes a radially outwardly projecting flange having an annular surface perpendicular an axis of rotation of the bearing unit, the flange being configured to support a disc for plowing land.

4. The hub bearing unit according to claim 2, wherein the hub includes three radially outwardly extending arms for soil seeding.

5. The hub bearing unit according to claim 2, wherein the shoulder at least partially radially overlaps the first shield.

6. The hub bearing unit according to claim 5, wherein the radial overlap of the shoulder and the first shield is from 0.2 mm to 0.5 mm.

7. The hub bearing unit according to claim 5, wherein an axial thickness of the shoulder is from 5.5 mm to 6.0 mm.

8. The hub bearing unit according to claim 2, wherein a radially outer diameter of the first shield is greater than a radially inner diameter of the shoulder.

9. The hub bearing unit according to claim 1, wherein an axially outer annular surface of the radially inner ring and the second annular surface lie in a common plane.

10. The hub bearing unit according to claim 9, wherein an axial dimension of the first path portion is from 0.1 mm to 0.2 mm.

11. The hub bearing unit according to claim 9, wherein the first shield includes a cylindrical portion and an annular portion extending radially outwardly from the cylindrical portion, and wherein the at least one elastomeric body includes at least one seal lip in contact with the cylindrical portion of the first shield and at least one seal lip in contact with the annular portion of the first shield.

12. A hub bearing unit comprising:

a hub having a cylindrical internal seat, a bearing unit including a rotatable outer ring connected to the internal seat and a stationary inner ring inside the outer ring, and a sealing device at least partly located in a gap between the outer ring and the inner ring, wherein the sealing device comprises:

a first shield mounted to a radially outer cylindrical surface of the radially inner ring, a second shield mounted by on a radially inner cylindrical surface of the radially outer ring, and at least one elastomeric seal body on at least a portion of the second shield, wherein the hub includes a radially inwardly extending shoulder axially delimiting the internal seat and located axially outward of the first shield, wherein a path extends from outside of the hub to the gap, wherein the path includes a first path portion defined by a first axially inwardly facing surface of the shoulder and an axially outwardly facing surface of the first shield and a second path portion extending from the first path portion and between a radially outer edge of the first shield and a radially inwardly facing cylindrical surface of the at least one elastomeric seal body, wherein the first shield is metallic and mounted to the radially outer cylindrical surface of the radially inner ring with an interference fit, wherein the second shield is metallic and mounted to the radially inner cylindrical surface of the radially outer ring with an interference fit, wherein the at least one elastomeric seal body is overmolded on the second shield, and wherein the hub includes three radially outwardly extending arms for soil seeding.

13. A hub bearing unit comprising:

a hub having a cylindrical internal seat, a bearing unit including a rotatable outer ring connected to the internal seat and a stationary inner ring inside the outer ring, and a sealing device at least partly located in a gap between the outer ring and the inner ring, wherein the sealing device comprises:

a first shield mounted to a radially outer cylindrical surface of the radially inner ring, a second shield mounted by on a radially inner cylindrical surface of the radially outer ring, and at least one elastomeric seal body on at least a portion of the second shield, wherein the hub includes a radially inwardly extending shoulder axially delimiting the internal seat and located axially outward of the first shield, wherein a path extends from outside of the hub to the gap, wherein the path includes a first path portion defined by a first axially inwardly facing surface of the shoulder and an axially outwardly facing surface of the first shield and a second path portion extending from the first path portion and between a radially outer edge of the first shield and a radially inwardly facing cylindrical surface of the at least one elastomeric seal body, wherein an axially outer annular surface of the radially outer ring abuts against a second axially inwardly facing surface of the shoulder, the second axially inwardly facing surface being located radially outward from the first axially inwardly facing surface and axially inward from the first axially inwardly facing surface, wherein an axially outer annular surface of the radially inner ring and the second axially inwardly facing surface lie in a common plane, wherein the first shield includes a cylindrical portion and an annular portion extending radially outwardly from the cylindrical portion, wherein the at least one elastomeric body includes at least one seal lip in contact with the cylindrical portion of the first shield and at least one seal lip in contact with the annular portion of the first shield, and wherein the shoulder and the hub are formed as one piece.

14. The hub bearing unit according to claim 13, wherein the hub includes three radially outwardly extending arms for soil seeding.

* * * * *